UNITED STATES PATENT OFFICE.

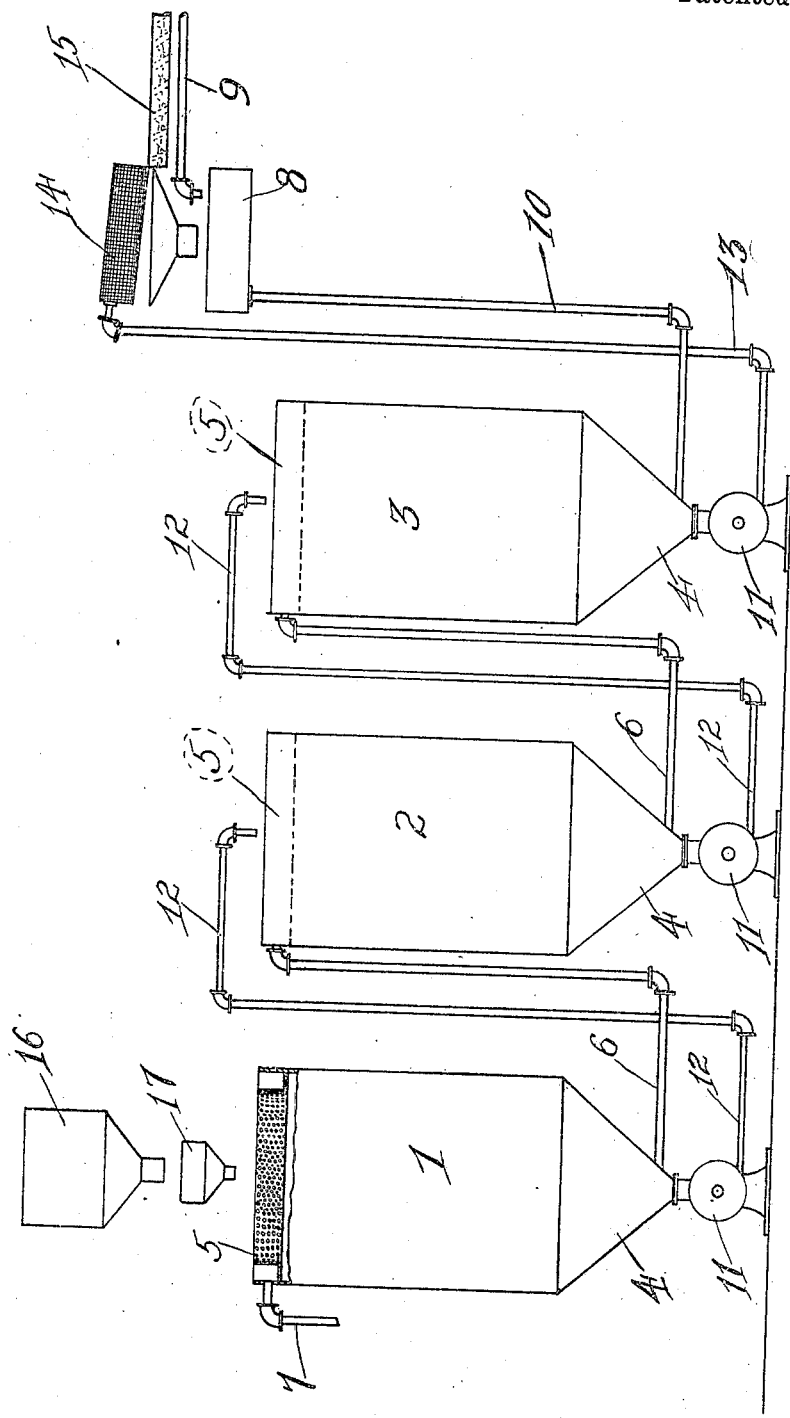

ALBERT PELTZER, OF CHICAGO, ILLINOIS.

APPARATUS FOR STEEPING CEREALS.

952,136.  Specification of Letters Patent.  Patented Mar. 15, 1910.

Application filed June 18, 1909.  Serial No. 503,000.

*To all whom it may concern:*

Be it known that I, ALBERT PELTZER, a subject of the German Emperor, residing at Chicago, in the county of Cook and State of Illinois, have invented certain new and useful Improvements in Apparatus for Steeping Cereals, of which the following is a specification.

My invention is an apparatus for steeping cereals, and my object is to provide a device improved with respect to simplicity in that it is valveless and may be inexpensively erected, and one in which the operation is continuous and uniform by reason of the fact that both cereal and water are kept in constant circulation in opposite directions.

In the accompanying drawings, which illustrate my invention, the figure is a diagrammatical view of an apparatus forming the preferred embodiment thereof.

The apparatus comprises a battery (any desired number) of steeping tanks, three of which are shown and numbered 1, 2 and 3 in accordance with the direction of movement of the cereal, and each having conical bases 4. Each of these tanks has, at its upper end, an overflow strain 5, from which strains of tanks 2 and 3 lead pipes 6 into the conical base of tanks 1 and 2, respectively, a discharge pipe 7 leading from the strain 5 of tank 1. A tank 8, having a fresh water inlet pipe 9 leading thereto, is arranged adjacent to, and above the level of, the steeping tank 3, and is connected to the base of said tank 3 by a pipe 10. Thus a circulation of water is formed through the steeping tanks, from the fresh water tank 8 to the discharge pipe 7 of tank 1, the water, as will be seen, flowing upwardly in each of the steeping tanks.

At the apex of their conical bases 4, each of the steeping tanks is provided with a centrifugal pump 11, from which pump of tanks 1 and 2 lead pipes 12 to and above the upper open ends of tanks 2 and 3, respectively, while from the pump 11 of tank 3 leads a pipe 13 upwardly to a reel 14 which, as ordinary, has a perforated base, arranged above and draining into the fresh water tank 8 and delivering upon a conveyer 15 to the mill. Thus the cereals dumped from a garner 16, arranged above tank 1, and into a scale 17, and from thence into said tank 1, will sink to the bottom thereof, through the steep water rising therein, and will be drawn out at the base by its pump 11 and delivered into the upper end of tank 2 through pipe 12 and in like manner through tank 2 to tank 3 and will be drawn out of the latter through pipe 13 and delivered to the reel 14 and thence to the mill by way of conveyer 15.

I claim:

1. A cereal steeping apparatus comprising a battery of steeping tanks, means to deliver cereal into the tank at one end of the battery, means to deliver water into the tank at the opposite end of the battery, and means to cause the opposite flow of the cereal and the water through the tanks comprising water pipes leading from the upper portions of each of the tanks to the lower portions of the next succeeding tank in one direction, a pump at the base of each of the tanks, and cereal pipes leading from the pumps to the upper portion of the next succeeding tank in the opposite direction.

2. A cereal steeping apparatus comprising a battery of steeping tanks, having overflow drains at their upper ends, means to deliver water into the lower portion of the tank at one end of the battery, water circulating pipes leading from the overflow drains of the tanks to the lower portions of the succeeding tanks in one direction through the battery, a pump at the base of each of the tanks, means to deliver a cereal to the upper end of the tank at the opposite end of the battery, and pipes leading from the said pumps to the upper ends of the succeeding tanks whereby the grain is moved by the pumps in the opposite direction through the battery.

In testimony whereof I affix my signature, in presence of two witnesses.

ALBERT PELTZER.

Witnesses:
 WM. KEMPF,
 V. PILLARGAN.